J. J. McINTYRE.
SPARK PLUG.
APPLICATION FILED OCT. 31, 1911.

1,041,835.

Patented Oct. 22, 1912.

WITNESSES
Louis Lucia
M. A. Shuckerow

INVENTOR
John J. McIntyre.
BY
H. Elhart
his ATTORNEY

UNITED STATES PATENT OFFICE.

JOHN J. McINTYRE, OF HARTFORD, CONNECTICUT.

SPARK-PLUG.

1,041,835.  Specification of Letters Patent.  Patented Oct. 22, 1912.

Application filed October 31, 1911. Serial No. 657,702.

*To all whom it may concern:*

Be it known that I, JOHN J. McINTYRE, a citizen of the United States, and a resident of Hartford, in the county of Hartford and State of Connecticut, have invented certain new and useful Improvements in Spark-Plugs, of which the following is a specification.

The object of this invention is to produce a spark plug for use in explosive engines and the like having features of novelty and advantage, and the invention relates particularly to the means for securing the porcelain plug in place in the shell and for holding the bushing on to the plug and also the invention relates to the form of the electrodes.

Figure 1:
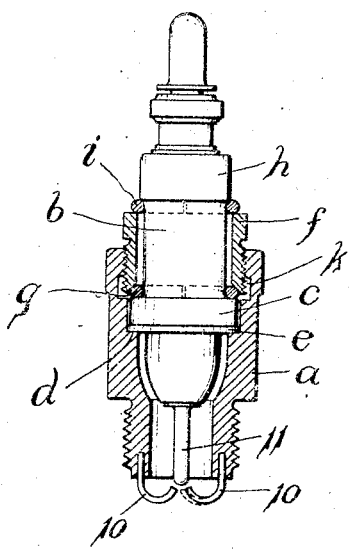
Figure 3:
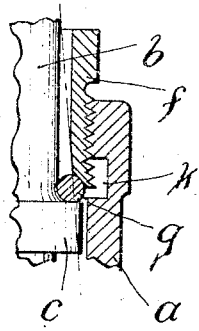
Figure 2:
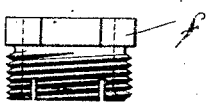

In the drawings: Figure 1 is an elevation of a plug made in accordance with my invention, the shell and bushing being shown in central vertical section. Fig. 2 is a detail view of a modified form of bushing. Fig. 3 is a detail sectional view showing on an enlarged scale the manner of locking the bushing in place.

Referring to the drawings, *a* denotes the shell usually made of suitable metal and having a threaded end which is screwed into the cylinder casing to present the electrodes properly within the cylinder.

*b* is the plug of insulating material, as porcelain, fitting centrally within the casing and having an enlargement *c* which forms a shoulder to rest upon a shoulder *d* in the shell, there being interposed between these two shoulders a suitable gasket *e* to produce a hermatic seal between the plug and shell when the plug is forced down into place by the bushing *f*. This bushing *f* fits down over the plug as shown and its lower end is beveled and rests upon a split metal ring *g*, which lies on the upper side of the enlargement *c* on the plug. The plug is enlarged slightly to form a shoulder *h* and between the end of the bushing and the shoulder a metallic ring *i* is sprung after the bushing is located, to prevent the bushing from coming off of the plug when the latter is removed from the shell. The bushing is threaded into a socket in the upper end of the shell and it will be noted that the lower end of this socket is undercut as indicated at *k*. This bushing *f* may be made of soft or hard metal. When soft metal is used the ring *g* should be of a relatively harder metal so that when the bushing is screwed down its beveled end comes into contact with the ring *g*, causing the end of the bushing to be spread into the undercut portion *k* and thus lock the bushing in place against accidental disengagement. The ring *g* is preferably non-rotatable upon the plug, thus relieving the more fragile porcelain from the combined turning and crowding effect and so minimizing the liability of breaking the plug when it is being set into place in the shell which brings the porcelain always to correct position within the shell. In order to insure so far as possible that the ring shall be non-rotatable on the plug it is split so as to make it resilient causing it to hug the plug when forced down by the bushing. In some cases where the plug is unusually smooth the engagement of the bushing with the ring may cause it to rotate on the plug. This is what might be termed an unusual condition and is not the preferred mode of operation. When the bushing *f* is made of hard material, as drawn steel tubing, its lower edge is slotted as indicated clearly in Fig. 2 so that when it comes in contact with the ring *g* it will be sprung out into the undercut part *k* and form a lock for the bushing.

By this construction I have provided a spark plug in which the porcelain plug can be removed from the shell and the bushing held in position on the plug and when the plug is in place in the shell it is securely locked against accidental disengagement.

That part of the invention relating to the electrodes is clearly illustrated in the drawings and consists in forming the negative electrodes 10—10 with their tips curved so that their ends are presented to the end of the positive electrode 11. Under the influence of the heat occasioned by the operation of the engine the electrodes 10—10 tend to unwind or straighten out and, although the amount of movement occasioned is slight, nevertheless, if provision is not made for always maintaining the sparking distance between the positive and negative electrodes uniform, the ignition system is affected. By forming the negative electrodes as illustrated herein the unwinding or straightening out of these electrodes moves their ends by the end of the positive electrode but during this movement the sparking distance is not altered, with the result that the condition of the ignition system can be maintained substantially uniform.

I claim as my invention:

1. In a device of the class specified, a shell, a plug of insulating material located therein and having embedded in it a rod of conducting material, a gasket interposed between engaging shoulders on the shell and plug, a bushing rotatably mounted on the plug and having threaded engagement with the shell, and means non-rotatable on the plug but coöperating with the end of said bushing to lock said bushing to said shell.

2. In a device of the class specified, a shell, a plug of insulating material located therein, a gasket interposed between engaging shoulders on the shell and plug, a bushing rotatably mounted on the plug and having threaded engagement with the shell, and means for spreading the lower end of said bushing for the purposes specified.

3. In a device of the character described, a shell having a central aperture extending therethrough, the upper part of said aperture being enlarged to form a socket having a threaded wall and an undercut portion beneath said threads, a plug of insulating material located in said aperture and resting on a shoulder and having embedded therein a rod of conducting material, a ring non-rotatable on said plug, a bushing surrounding said plug and having threaded engagement with said shell, the lower end of said bushing being yielding and adapted to be spread into the undercut portion of the socket by said ring for the purpose described.

4. In a device of the character described, a shoulder having a central aperture extending therethrough, the upper part of said aperture being enlarged to form a socket having a threaded wall and an undercut portion beneath said threads, a plug of insulating material located in said aperture and resting on a shoulder and having embedded therein a rod of conducting material, a bushing surrounding said plug and having threaded engagement with said shell, the lower end of said bushing being yielding, and means on said plug coöperating with the yielding lower end of said bushing to spread it into the undercut portion of the socket for the purpose described.

JOHN J. McINTYRE.

Witnesses:
M. E. O'Neill,
H. E. Hart.